(12) United States Patent
Lee

(10) Patent No.: US 6,985,715 B2
(45) Date of Patent: Jan. 10, 2006

(54) METHOD AND DEVICE FOR FREQUENCY TRANSLATION IN POWERLINE COMMUNICATIONS

(75) Inventor: Jack Wing Lee, Sudbury, MA (US)

(73) Assignee: Amperion, Inc., Andover, MA (US)

( * ) Notice: Subject to any disclaimer, the term of this patent is extended or adjusted under 35 U.S.C. 154(b) by 77 days.

(21) Appl. No.: 10/448,918

(22) Filed: May 29, 2003

(65) Prior Publication Data
US 2004/0242185 A1 Dec. 2, 2004

(51) Int. Cl.
H04M 9/00 (2006.01)
H04B 1/00 (2006.01)

(52) U.S. Cl. .................. 455/402; 455/63.1; 455/114.2; 455/296

(58) Field of Classification Search ................ 455/402, 455/7, 11.1, 19, 20, 21, 22, 23, 75, 571, 131, 455/313, 63.1, 114.2, 296; 340/310.01, 310.02, 340/310.03, 310.06; 375/222
See application file for complete search history.

(56) References Cited

U.S. PATENT DOCUMENTS

| | | | | |
|---|---|---|---|---|
| 5,870,016 A | * | 2/1999 | Shrestha | 340/310.02 |
| 5,930,729 A | * | 7/1999 | Khamis et al. | 455/20 |
| 6,088,570 A | * | 7/2000 | Komara et al. | 455/11.1 |
| 6,396,392 B1 | * | 5/2002 | Abraham | 340/310.01 |
| 6,459,881 B1 | * | 10/2002 | Hoder et al. | 455/11.1 |
| 6,549,761 B1 | * | 4/2003 | Kim | 455/75 |

* cited by examiner

Primary Examiner—Quochien B. Vuong
(74) Attorney, Agent, or Firm—Ware, Fressola, Van Der Sluys & Adolphson LLP

(57) ABSTRACT

A method and apparatus for transmitting and receiving RF signals for broadband communications using power lines as communication medium. A super-heterodyne structure is used to translate the signals from one frequency to another so as to avoid interference sources, which may corrupt the communication signals. In the heterodyne structure, a plurality of local oscillators are used to mix the local oscillator signals with the communication signals for frequency translation. A plurality of frequency filters are used to filtered out unwanted signals. The communication signals are imparted onto or received from the power lines via couplers operatively connected to modems.

24 Claims, 4 Drawing Sheets

METHOD AND DEVICE FOR FREQUENCY TRANSLATION IN POWERLINE COMMUNICATIONS

FIELD OF THE INVENTION

The present invention relates generally to the use of radio frequencies for transmitting signals on a power line and, more particularly, to broadband communications using a power line as a transmission medium.

BACKGROUND OF THE INVENTION

In power-line communications (PLC), utility power lines, especially the high-voltage (HV, 60 kVAC and up) and medium-voltage (MV, 4–35 kVAC) power lines, are used as a transmission medium. The MV power lines are generally used to power the primaries of distribution transformers feeding electric power to homes and businesses. It is advantageous to convey communication signals in radio frequencies.

A typical scenario in PLC is shown in FIG. 1. As shown, a main power line L1 and a number of other power lines L2, L3, L4 branching off from L1 are used to carry the RF communication signals. A server 10 is used at a distribution center to receive multimedia information from service providers and to send the information to a plurality of customers downstream. The server 10 uses an RF coupler 12 and an associated distribution modem 11 to broadcast the RF communication signals on power line L1 so that the customers can receive the signals using their customer premise equipment (CPE). For example, CPE 20 and CPE 30 acquire the RF signals from L1 via RF couplers 22, 32 and associated modems 21, 31 while CPE 40 acquires the RF signals from L3 via a RF coupler 42 and an associated modem 41, and so on. In the upstream direction, customers can use their CPE to send request data to the server via the same couplers and modems.

RF signals are attenuated considerably as they are transmitted along the power line. As a result, a CPE located too far from the server 10 may not be able to receive usable RF signals. For example, while CPE 20 may be able to receive good signals from the server 10, CPEs 30, 40 and 50 may not. Thus, it is necessary to provide a plurality of repeaters 72, 74, . . . along the power lines to make it possible for CPE 30, 40 and 50 to receive the communication signals.

RF signals transmitted along the power line are susceptible to a variety of interference sources. For example, interfering signals from electrical impulses, amateur radio bands and AM radio broadcasting can corrupt the RF signals, rendering the detection and demodulation of RF signals ineffective. It is thus advantageous and desirable to provide a method and device to reduce the effects of signal interference.

SUMMARY OF THE INVENTION

It is a primary objective of the present invention to provide a method of improving communication signals along a power line where interference sources may corrupt the communication signals. This objective can be achieved by using a heterodyne structure in a modem as a high selectivity filter to reject the interference on the power line channel.

Thus, according to the first aspect of the present invention, there is provided a power line communications (PLC) modem capable of transmission of communication data in broadband communications using power lines as a communication medium. The modem comprises:

a modulator, responsive to communication data, for generating a modulated signal that is modulated by said communication data;

a first filter, responsive to the modulated signal, for providing a first filtered modulated signal;

a first multiplier, responsive to the first filtered modulated signal and to a first oscillator signal, for generating a first mixed signal based upon mixing the first filtered modulated signal and the first oscillator signal;

a second filter, responsive to the first mixed signal, for providing a filtered first mixed signal;

a second multiplier, operatively connected to the second filter and responsive to a second oscillator signal, for generating a second mixed signal based upon mixing the filtered first mixed signal and the second oscillator signal;

a radio-frequency filter, responsive to the second mixed signal, for providing a filtered RF output signal; and means, operatively connected to the RF filter, for coupling the filtered RF output signal to at least one of the power lines.

The modem further comprises an amplifier, operatively connected to the second multiplier and the second filter, for amplifying the filtered first mixed signal prior to the second multiplier generating the second mixed signal based upon mixing the filtered first mixed signal and the second oscillator signal, and an amplifier, operatively connected to the coupling means and the RF filter, for amplifying the filtered RF output signal prior to said coupling means coupling the filtered RF output signal to one of the power lines.

The modem is also capable of reception of broadband communications from the power lines, and further comprises:

means, coupled to said at least one power line, for receiving an RF input signal from said at least one power line;

a further RF filter, responsive to the received RF input signal, for providing a filtered RF input signal;

a third multiplier, responsive to the filtered RF input signal and a third oscillator signal, for generating a third mixed signal based upon mixing the filtered RF input signal and the third oscillator signal;

a third filter, responsive to the third mixed signal, for providing a filtered third mixed signal;

a fourth multiplier, operatively connected to the third filter and responsive to a fourth oscillator signal, for providing a fourth mixed signal based upon mixing the filtered third mixed signal and the fourth oscillator signal;

a fourth filter, responsive to the fourth mixed signal, for providing a filtered fourth mixed signal; and a demodulator, responsive to the filtered fourth mixed signal, for generating further communication data.

The modem further comprises an amplifier, operatively connected to the receiving means and further RF filter, for amplifying the received RF input signal prior to said further RF filter providing the filtered RF input signal based on the received RF input signal, and another amplifier, operatively connected to the third filter and the fourth multiplier, for amplifying the filtered third mixed signal prior to said fourth multiplier generating the fourth mixed signal based upon mixing the filtered third mixed signal and the fourth oscillator signal.

Preferably, when the modem is associated with customer premises equipment:

the first oscillator signal has a frequency substantially equal to 73.75 MHz;

the second oscillator signal has a frequency range substantially equal to 73.75 MHz to 118.75 MHz;

the modulated signal has a frequency substantially equal to 3.75 MHz with a bandwidth of 2.5 MHz;

the filtered first mixed signal has a frequency substantially equal to 70 MHz with a bandwidth of 2.5 MHz;

the filtered RF output signal has a frequency range substantially equal to 3.75 MHz to 48.75 MHz with a bandwidth of 2.5 MHz;

the third oscillator signal has a frequency range substantially equal to 149.8 MHz to 187.8 MHz;

the fourth oscillator signal has a frequency substantially equal to 149.8 MHz;

the RF input signal has a frequency range substantially equal to 9.8 MHz to 47.8 MHz with bandwidth of 4 MHz;

the filtered third mixed signal has a frequency substantially equal to 140 MHz with a bandwidth of 4 MHz; and the filtered fourth mixed signal has a frequency substantially equal to 9.8 MHz with a bandwidth of 4 MHz.

Preferably, when the modem is associated with a head end:

the first oscillator signal has a frequency substantially equal to 149.8 MHz;

the second oscillator signal has a frequency range substantially equal to 149.8 MHz to 187.8 MHz;

the modulated signal has a frequency substantially equal to 9.8 MHz with a bandwidth of 4 MHz;

the filtered first mixed signal has a frequency substantially equal to 140 MHz with a bandwidth of 4 MHz;

the filtered RF output signal has a frequency range substantially equal to 9.8 MHz to 47.8 MHz with a bandwidth of 4 MHz;

the third oscillator signal has a frequency range substantially equal to 73.75 MHz to 118.75 MHz;

the fourth oscillator signal has a frequency substantially equal to 73.75 MHz;

the RF input signal has a frequency range substantially equal to 3.75 MHz to 48.75 MHz with bandwidth of 2.5 MHz;

the filtered third mixed signal has a frequency substantially equal to 70 MHz with a bandwidth of 2.5 MHz; and the filtered fourth mixed signal has a frequency substantially equal to 3.75 MHz with a bandwidth of 2.5 MHz.

According to the second aspect of the present invention, there is provided a method of broadband communications for transmitting communication data using power lines as communication medium. The method comprises the steps of:

generating a modulated signal that is modulated by the communication data;

filtering the modulated signal for providing a first filtered modulated signal;

mixing the first filtered modulated signal and a first oscillator signal for providing a first mixed signal;

filtering the first mixed signal for providing a filtered first mixed signal;

mixing the filtered first mixed signal and a second oscillator signal for providing a second mixed signal; and filtering the second mixed signal for providing a filtered RF output signal; and coupling the filtered RF output signal to at least one of the power lines.

The method further comprises the steps of:

amplifying the filtered first mixed signal prior to mixing the filtered first mixed signal and the second oscillator signal, and amplifying the filtered RF output signal prior to said coupling.

According to a third aspect of the present invention, there is provided a method of broadband communications for receiving communication data using power lines as communication medium. The method comprises the steps of:

receiving an RF input signal indicative of the communication data from at least one of the power lines via coupling;

filtering the received RF input signal for providing a filtered RF input signal;

mixing the filtered RF input signal with a first oscillator signal for providing a first mixed signal;

filtering the first mixed signal for providing a filtered first mixed signal;

mixing the filtered first mixed signal and a second oscillator signal for providing a second mixed signal;

filtering the second mixed signal for providing a filtered second mixed signal; and obtaining the communication data based upon demodulating the filtered second mixed signal.

The method further comprises the steps of:

amplifying the received RF input signal prior to filtering the received RF signal, and amplifying the filtered first mixed signal prior to mixing the filtered first mixed signal with a second oscillator signal.

The present invention will become apparent upon reading the description taken in conjunction with FIGS. 2a to 3.

BEST MODE TO CARRY OUT THE INVENTION

The desired RF signals in power line communications generally occupy a finite range of frequency. Likewise, interfering signals generally also occupy a finite range of frequency. Thus, it is possible to shift the RF signals from one frequency to another frequency so as to reduce the effects of interfering sources on the detection and demodulation of RF signals. The shifting of the frequency range can be accomplished by frequency translation in the analog front end of a modem or a repeater.

The method and device of frequency translation, according to the present invention, uses a super-heterodyne structure to establish one or more fixed IF (Intermediate frequency) range. The frequency translation in a transmitter is shown in FIG. 2a, and that in a receiver is shown in FIG. 2b.

Figure 1:
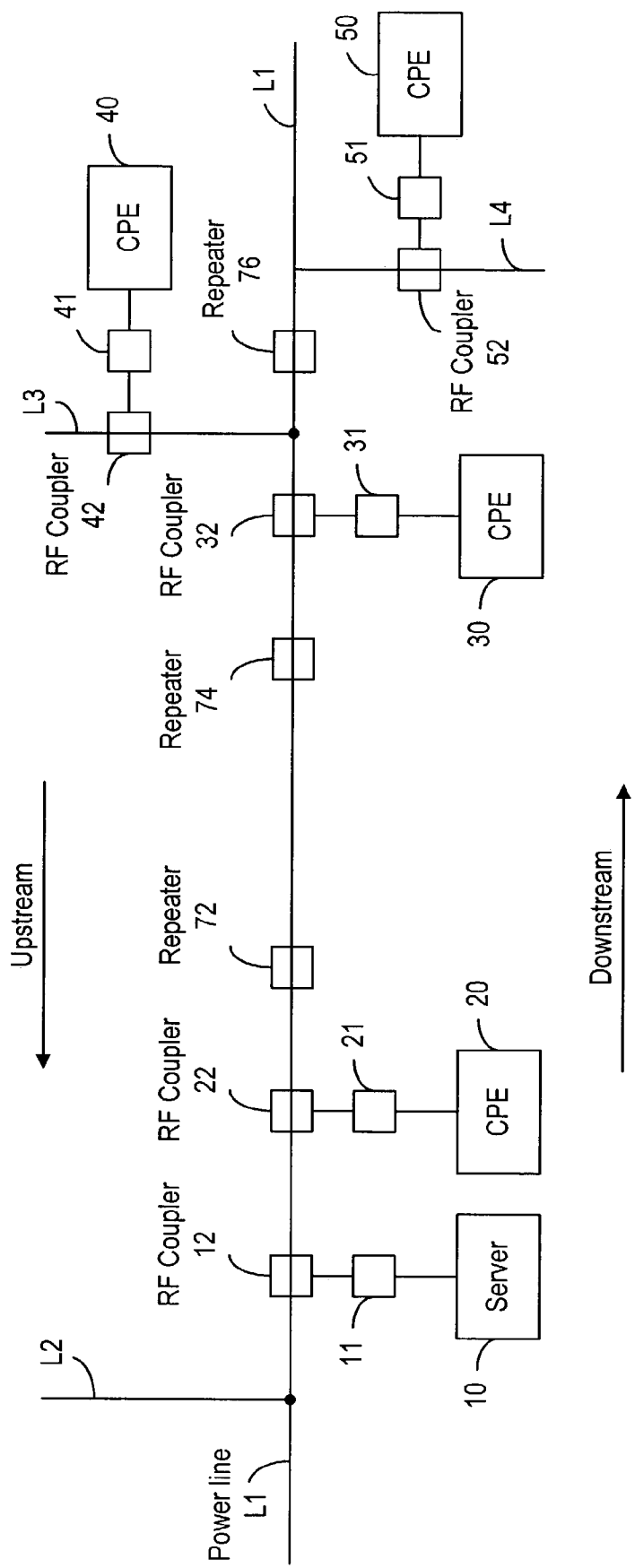
FIG. 1 is a schematic representation showing a power line communication network.
Figure 2A:
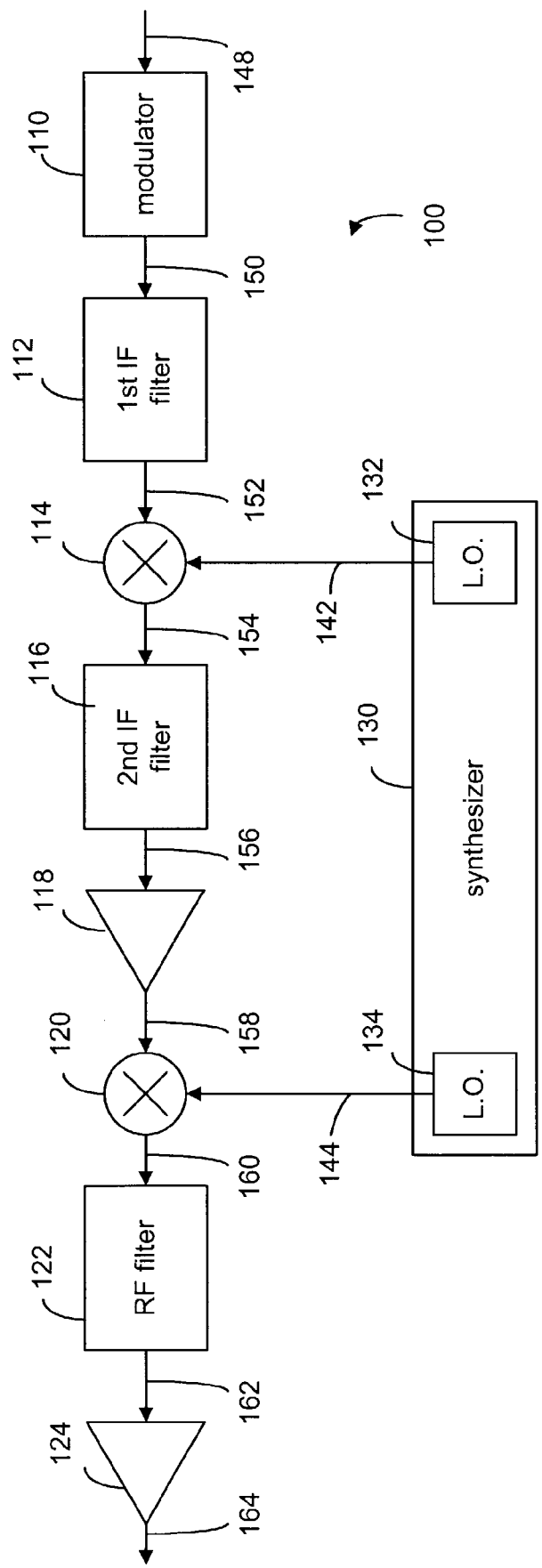
FIG. 2a is a block diagram illustrating a translation circuit in an RF transmitter.
Figure 2B:
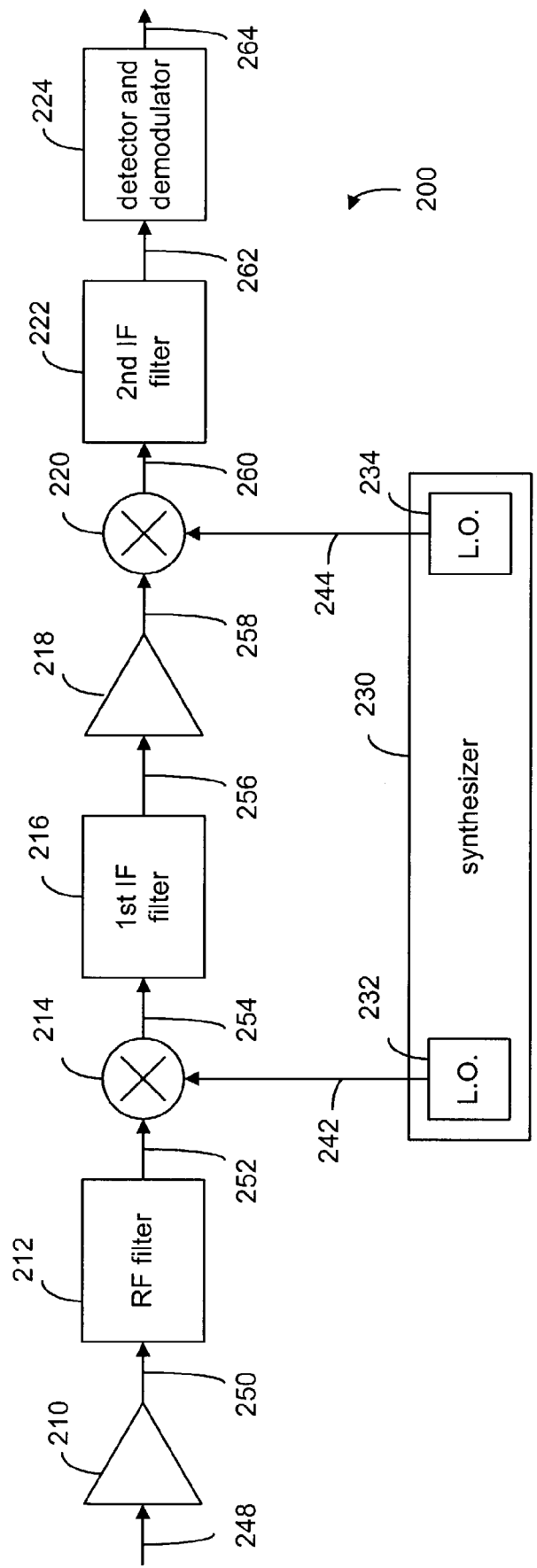
FIG. 2b is a block diagram illustrating a translation circuit in an RF receiver.

FIG. 2a is a block diagram illustrating frequency translation in a transmitter 100, according to the present invention. A frequency synthesizer 130 is used to generate a sinusoidal or time-varying signal 142 from a first local oscillator 132 to drive a first RF mixer 114 for generating an upper sideband and a lower sideband in signal 154. If the transmitter 100 is used in a modem 21 associated with CPE 20 (FIG. 1), the first local oscillator 132 has a frequency of 73.75 MHz, for example. If the transmitter is used in a modem 11 associated with a server 10, the first local oscillator 132 has a frequency of 149.8 MHz, for example. Likewise, the frequency synthesizer 130 generates another sinusoidal or time-varying signal 144 from a second local oscillator 134 to drive the second RF mixer 120 for generating upper and lower sidebands in signal 160. If the transmitter 100 is used in the modem 21, the second local oscillator 134 has frequency of range of 73.75 MHz to 118.75 MHz, for example. If the transmitter 100 is used in the modem 11, the second local oscillator 134 has a frequency range of 149.8 to 187.8 MHz, for example. Preferably, the upper sideband, along with other undesirable frequencies in the signal 154 is filtered out by an IF filter 116 to become a filter signal 156, which is amplified by an IF amplifier 118 to become signal 158. Likewise, the upper sideband, along with other undesirable frequencies in the signal 160, is filtered out by the RF filter 122.

The transmitter 100 has two IF (Intermediate frequency) stages prior to the final RF generation. As shown in FIG. 2a, a modulator 110 is used to generate a communication signal 150, which is modulated by communication data 148. The communication signal 150 occupies a fixed center frequency, with a predetermined bandwidth. The first IF filter 112 allows the communication signal 150 to pass through but filters out unwanted signals due to discrete time sampling or the like. The filtered signal is denoted by reference numeral 152. The first RF mixer 114 translates the filtered communication signal 152 by mixing it with the time-varying signal 142 to a second frequency. The signal translated to the second frequency is denoted by reference numeral 154. After being filtered by a second IF filter 116, the translated signal becomes a filtered translated signal 156, which is amplified by an IF amplifier 118. At this stage, only the lower sideband generated by the first RF mixing process is allowed to pass through the second IF filtering. The upper sideband and other undesirable frequencies are rejected. The amplified filtered signal 158 has a predetermined frequency.

The amplified filtered signal 158 from the amplifier 118 is mixed with the time-varying signal 144 by a second RF mixer 120 in a final translation in order to produce an RF signal 160 in the desired range of transmission frequencies. The signal 160 is filtered by an RF filter 122 so that undesirable sideband due to the mixing process is blocked out. The filtered signal 162 is amplified by an RF amplifier 124 to produce an amplified RF signal 164 to be coupled to a power line via an RF coupler (see FIG. 1).

The center frequency and the bandwidth of the communication signal are generally dependent upon where the transmitter 100 is used. If the transmitter 100 is used in a modem 11 in a head-end or server 10 (see FIG. 1), the center frequency can be set at 9.8 MHz with a bandwidth of 4 MHz, for example. If the transmitter 100 is used in a modem 21 in a CPE 20, the center frequency can be set at 3.75 MHz with a bandwidth of 2.5 MHz, for example. Accordingly, the frequency of the filtered signal 158 is 140 MHz with a bandwidth of 4 MHz in the server modem 11, and 70 MHz with a bandwidth of 2.5 MHz in the CPE modem 21, for example. The frequency range of the amplified RF signal 164 is 9.8 to 47.8 MHz with a bandwidth of 4 MHz in the server modem 11 and 3.75 to 48.75 MHz with a bandwidth of 2.5 MHz in the CPE modem 21, for example. As such, it is possible to shift the frequency of the communication signal 150 to a different frequency at the RF filtering stage using the RF filter 122. By selecting the frequency of the second local oscillator 134, it is possible to translate the frequency of the communication signal to a desired frequency for transmission so as to avoid the known or expected interference sources, such as amateur radio bands, AM radio broadcasting, etc.

FIG. 2b is a block diagram illustrating frequency translation in a receiver 200, according to the present invention. A frequency synthesizer 230 is used to generate a time-varying signal 242 from a first local oscillator 232 to drive a first RF mixer 214 for generating an upper sideband and a lower sideband in signal 254. If the receiver 200 is used in a modem 21 associated with CPE 20, the first local oscillator 232 has a frequency range of 149.8 MHz to 187.8 MHz, for example. If the receiver 200 is used in a modem 11 associated with a server 10, the first local oscillator 232 has a frequency range of 73.75 to 118.75 MHz, for example. Likewise, the frequency synthesizer 230 generates another time-varying signal 244 from a second local oscillator 234 to drive the second RF mixer 220 for generating upper and lower sidebands in signal 260. If the receiver 200 is used in the modem 21, the second local oscillator 234 has a frequency of 149.8 MHz, for example. If the receiver 200 is used in the modem 11, the second local oscillator has a frequency of 73.75 MHz, for example. Preferably, the upper sideband, along with other undesirable frequencies in the signal 254 is filtered out by an IF filter 216 and becomes a filtered signal 256, which is then amplified by an IF amplifier 218 to become signal 258. Likewise, the upper sideband, along with other undesirable frequencies in the signal 260 is filtered out by the RF filter 222.

The receiver 200 has two IF (Intermediate frequency) stages prior to the final frequency detection and demodulation. As shown in FIG. 2b, an RF amplifier 210 is used to amplify a received RF signal 248, which occupies a frequency range with a predetermined bandwidth. The RF filter 212 filters out unwanted signals and noise in the received RF signal. The filtered signal is denoted by reference numeral 252. The first RF mixer 214 translates the filtered RF signal 252 by mixing it with the time-varying signal 242 to a second frequency range. The signal translated to the second frequency range is denoted by reference numeral 254. The signal 254 has an upper band and a lower band. A first IF filter 216 is used to filter out the upper band. The filtered signal, denoted by reference numeral 256, is amplified by an IF amplifier 218. This amplified signal 258 has a different frequency.

The amplified signal 258 is mixed with the time-varying signal 244 by a second RF mixer 220 in a final translation in order to produce a communication signal 260 in the desired frequency. The signal 260 is filtered by a second IF filter 222 so that undesirable sideband due to the mixing process is blocked out. The filtered signal 262 is demodulated by a detector/demodulator module 224 to become a demodulated signal 264.

As with the transmitter 100, the frequencies and the bandwidths at different stages in the receiver 200 depend on where the receiver 200 is used. If the receiver 200 is used in a head-end server modem 11, the frequency of the received RF signal 248 ranges from 3.75 to 48.75 MHz with a bandwidth of 2.5 MHz, for example. If the receiver 200 is used in a CPE modem 21, the frequency of the received RF signal 248 ranges from 9.8 to 47.8 MHz with a bandwidth of 4 MHz, for example. With a local oscillator 232 having a frequency range of 73.75 MHz to 118.75 MHz (in server modem 11) and 149.8 MHz to 187.8 MHz (in CPE modem 21), for example, it is possible to convert the frequency of the RF signal to a fixed frequency in the intermediate stage of 70 MHz with a bandwidth of 2.5 MHz (in the server modem 11) and 140 MHz with a bandwidth of 4 MHz (in the CPE modem 21), for example. After the mixing at the second frequency conversion stage, a fixed frequency for the filtered signal 262 of 3.75 MHz (BW=2.5 MHz) in the server modem 11 is achieved. Likewise, a fixed frequency of 9.8 MHz (BW=4 MHz) in the CPE modem 21 is achieved.

Figure 3:
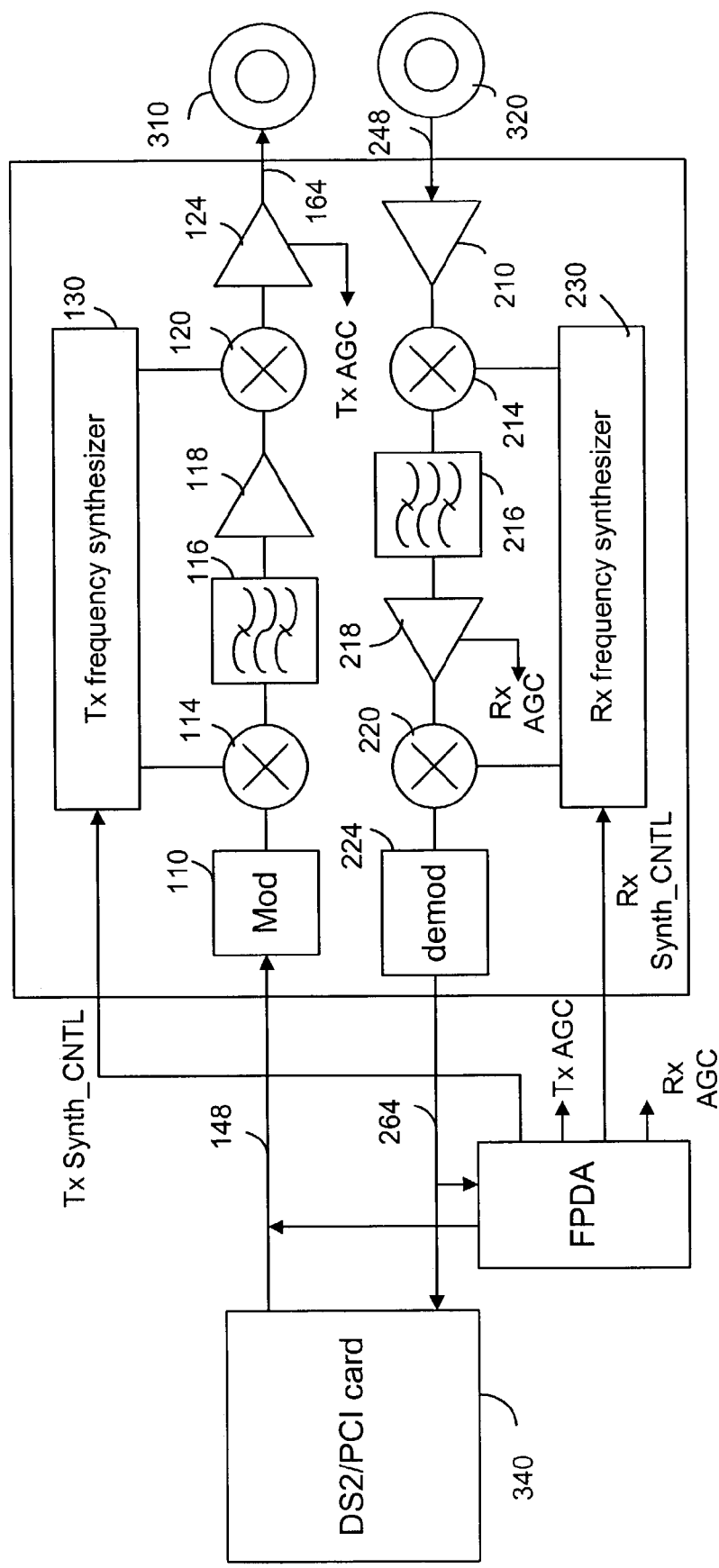
FIG. 3 is a block diagram illustrating an analog front-end.

The super-heterodyne structure in the transmitter 100 and the receiver 200 allows economical usage of highly selective filtering to reject interference on the power line. The transmitter 100 and the receiver 200 can be integrated in an analog front-end 300, as shown in FIG. 3. The analog front-end 300 includes a modulator 110 (FIG. 2a), which performs Discrete Multi-Tone (DMT) modulation for transmission. The front-end 300 operatively connecting a DS2 modem 340 and a coupler 310, which is capable of coupling the RF signal 164 to a power line. Likewise, the front-end 300 receives RF signal 248 (see FIG. 2b) from the power line via another coupler 320. The couplers 310 and 320 can be inductive or capacitive couplers.

Preferably, all the IF filters in the analog front-end 300 are of a surface acoustic wave (SAW) structure, which has sharp rejection of out-of-band spectral components. The typical SAW rejection is 50 to 60 dB. As such, the receiver dynamic range increases by the rejection capability of the SAW. For example, an analog-to-digital converter (ADC) has 11-bit quantization and the dynamic range is 66 dB. In general, a digital filter can reject out-of-band components if the non-desirable signals do not saturate the ADC. This means the out-of-band signal must be within the ADC dynamic range. Placing a highly selective SAW lowers the non-desirable signal level into the ADC and does not cause saturation. With an 11-bit ADC, the receiver can tolerate a dynamic range of 116 dB if the SAW rejection is 50 dB.

It should be understood that the frequencies, frequency ranges and bandwidth given at various stages in the super-heterodyne structure in the transmitter 100 and the receiver 200 are preferred values. But other frequencies, frequency range and bandwidth can also be used. Furthermore, the number of mixing stages can be different from two.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A power line communications (PLC) modem for translating a broadband radio frequency (RF) output signal used for the transmission of communication data in broadband communications using power lines as a communication medium so as to avoid frequencies associated with interfering signals, said modem comprising:
    a modulator, responsive to communication data, for generating a modulated signal that is modulated by said communication data;
    a first filter, responsive to the modulated signal, for providing a first filtered modulated signal;
    a first multiplier, responsive to the first filtered modulated signal and to a first oscillator signal, for generating a first mixed signal based upon mixing the first filtered modulated signal and the first oscillator signal;
    a second filter, responsive to the first mixed signal, for providing a filtered first mixed signal;
    a second oscillator signal having a selectable operating frequency over an operating frequency range;
    a second multiplier, operatively connected to the second filter and responsive to the second oscillator signal, for generating a second mixed signal based upon mixing the filtered first mixed signal and the second oscillator signal;
    a radio-frequency filter, responsive to the second mixed signal, for providing a filtered broadband RF output signal; and
    means, operatively connected to the RF filter, for coupling the filtered broadband RF output signal to at least one of the power lines;
    whereby the broadband RF output signal has a selectable operating frequency so as to be able to avoid frequencies associated with interfering signals.

2. The modem of claim 1, further comprising an amplifier, operatively connected to the second multiplier and the second filter, for amplifying the filtered first mixed signal prior to the second multiplier generating the second mixed signal based upon mixing the filtered first mixed signal and the second oscillator signal.

3. The modem of claim 1, further comprising an amplifier, operatively connected to the coupling means and the RF filter, for amplifying the filtered RF output signal prior to said coupling means coupling the filtered RF output signal to one of the power lines.

4. The modem of claim 1, also capable of reception of broadband communications from the power lines, said modem further comprising:
    means, coupled to said at least one power line, for receiving an RF input signal from said at least one power line;
    a further RF filter, responsive to the received RF input signal, for providing a filtered RF input signal;
    a third multiplier, responsive to the filtered RF input signal and a third oscillator signal, for generating a third mixed signal based upon mixing the filtered RF input signal and the third oscillator signal;
    a third filter, responsive to the third mixed signal, for providing a filtered third mixed signal;
    a fourth multiplier, operatively connected to the third filter and responsive to a fourth oscillator signal, for providing a fourth mixed signal based upon mixing the filtered third mixed signal and the fourth oscillator signal;
    a fourth filter, responsive to the fourth mixed signal, for providing a filtered fourth mixed signal; and
    a demodulator, responsive to the filtered fourth mixed signal, for generating further communication data.

5. The modem of claim 4, further comprising
an amplifier, operatively connected to the receiving means and further RF filter, for amplifying the received RF input signal prior to said further RF filter providing the filtered RF input signal based on the received RF input signal.

6. The modem of claim 4, further comprising
an amplifier, operatively connected to the third filter and the fourth multiplier, for amplifying the filtered third mixed signal prior to said fourth multiplier generating the fourth mixed signal based upon mixing the filtered third mixed signal and the fourth oscillator signal.

7. The modem of claim 4, wherein the RF input signal has a frequency range substantially equal to 9.8 MHz to 47.8 MHz.

8. The modem of claim 7, wherein the third oscillator signal has a frequency range substantially equal to 149.8 MHz to 187.8 MHz, and the filtered third mixed signal has a frequency substantially equal to 140 MHz with a bandwidth of 4 MHz.

9. The modem of claim 8, wherein the fourth oscillator signal has a frequency substantially equal to 149.8 MHz, and the filtered fourth mixed signal has a frequency substantially equal to 9.8 MHz with a bandwidth of 4 MHz.

10. The modem of claim 4, wherein the RF input signal has a frequency range substantially equal to 3.75 MHz to 48.75 MHz.

11. The modem of claim 10, wherein the third oscillator signal has a frequency range substantially equal to 73.75 MHz to 118.75 MHz, and the filtered third mixed signal has a frequency substantially equal to 70 MHz with a bandwidth of 2.5 MHz.

12. The modem of claim 11, wherein the fourth oscillator signal has a frequency substantially equal to 73.75 MHz, and the filtered fourth mixed signal has a frequency substantially equal to 3.75 MHz with a bandwidth of 2.5 MHz.

13. The modem of claim 1, wherein the first oscillator signal has a frequency substantially equal to 73.75 MHz.

14. The modem of claim 13, wherein the modulated signal has a frequency substantially equal to 3.75 MHz with a bandwidth of 2.5 MHz and the filtered first mixed signal has a frequency substantially equal to 70 MHz with a bandwidth of 2.5 MHz.

15. The modem of claim 14, wherein the second oscillator signal has a frequency range substantially equal to 73.75 MHz to 118.75 MHz, and the filtered RF output signal has frequency range substantially equal to 3.75 MHz to 48.75 MHz with a bandwidth of 2.5 MHz.

16. The modem of claim 1, wherein the first oscillator signal has a frequency substantially equal to 149.8 MHz.

17. The modem of claim 16, wherein the modulated signal has a frequency substantially equal to 9.8 MHz with a bandwidth of 4 MHz and the filtered first mixed signal has a frequency substantially equal to 140 MHz with a bandwidth of 4 MHz.

18. The modem of claim 17, wherein the second oscillator signal has a frequency range substantially equal to 149.8 MHz to 187.8 MHz, and the filtered RF output signal has frequency range substantially equal to 9.8 MHz to 47.8 MHz with a bandwidth of 4 MHz.

19. A method of broadband communications for translating a broadband radio frequency (RF) signal used for transmitting communication data using power lines as a communication medium so as to avoid frequencies associated with interfering signals, said method comprising the steps of:
generating a modulated signal that is modulated by the communication data;
filtering the modulated signal for providing a first filtered modulated signal;
mixing the first filtered modulated signal and a first oscillator signal for providing a first mixed signal;
filtering the first mixed signal for providing a filtered first mixed signal;
providing a second oscillator signal having a selectable operating frequency over an operating frequency range;
mixing the filtered first mixed signal and the second oscillator signal for providing a second mixed signal;
filtering the second mixed signal for providing a filtered broadband RF output signal; and
coupling the filtered broadband RF output signal to at least one of the power lines,
whereby the broadband RF output signal has a selectable operating frequency so as to be able to avoid frequencies associated with interfering signals.

20. The method of claim 19 further comprising the step of amplifying the filtered first mixed signal prior to mixing the filtered first mixed signal and the second oscillator signal.

21. The method of claim 19, further comprising the step of
amplifying the filtered RF output signal prior to said coupling.

22. A method of broadband communications for translating a broadband radio frequency (RF) signal used for receiving communication data using power lines as a communication medium so as to avoid frequencies associated with interfering signals, said method comprising the steps of:
receiving a broadband RF input signal indicative of the communication data from at least one of the power lines via coupling;
filtering the received RF input signal for providing a filtered RF input signal;
mixing the filtered RF input signal with a first oscillator signal for providing a first mixed signal;
filtering the first mixed signal for providing a filtered first mixed signal;
providing a second oscillator signal having a selectable operating frequency over an operating frequency range;
mixing the filtered first mixed signal and the second oscillator signal for providing a second mixed signal;
filtering the second mixed signal for providing a filtered second mixed signal; and
obtaining the communication data based upon demodulating the filtered second mixed signal,
whereby the broadband RF input signal has a selectable operating frequency so as to be able to avoid frequencies associated with interfering signals.

23. The method of claim 22, further comprising the step of
amplifying the received RF input signal prior to filtering the received RF signal.

24. The method of claim 22, further comprising the step of
amplifying the filtered first mixed signal prior to mixing the filtered first mixed signal with a second oscillator signal.

* * * * *